United States Patent [19]

Mizobuchi et al.

[11] Patent Number: 4,757,240
[45] Date of Patent: Jul. 12, 1988

[54] APPARATUS FOR CONTROLLING ELECTRIC VEHICLE USING INDUCTION MOTOR

[75] Inventors: Tetsuya Mizobuchi; Tsutomu Ozawa, both of Katsuta, Japan

[73] Assignee: Hitachi, Ltd., Tokyo, Japan

[21] Appl. No.: 915,381

[22] Filed: Oct. 6, 1986

[30] Foreign Application Priority Data

Oct. 4, 1985 [JP] Japan ................................. 60-220124

[51] Int. Cl.$^4$ ............................................... H02P 5/46
[52] U.S. Cl. ........................................ 318/52; 318/71; 318/723; 318/800
[58] Field of Search ............... 318/800, 801, 802, 803, 318/52, 71, 6, 723

[56] References Cited

U.S. PATENT DOCUMENTS

| 4,315,203 | 2/1982 | Ibamoto et al. | 318/801 |
| 4,327,313 | 4/1982 | Tsuboi et al. | 318/52 |
| 4,335,337 | 6/1982 | Okamatsu et al. | 318/71 |
| 4,463,289 | 7/1984 | Young | 318/52 |
| 4,701,682 | 10/1987 | Hirotsu et al. | 318/52 |

FOREIGN PATENT DOCUMENTS 0059924 9/1982 European Pat. Off. .
51-31376 9/1977 Japan .

Primary Examiner—William M. Shoop, Jr.
Assistant Examiner—Brian Young
Attorney, Agent, or Firm—Antonelli, Terry & Wands

[57] ABSTRACT

A main circuit of an electric vehicle using an induction motor is constituted by an invertor for producing three phase AC power having a variable frequency and a variable voltage and a three-phase induction motor supplied with the AC power by the invertor. The rotational speed of the induction motor is detected and a slip frequency signal is added (in power running) or subtracted (in regenerating running) to or from the rotational speed to control the output frequency of the invertor. On the other hand, the output voltage of the invertor is controlled to be in proportion to the output frequency thereof. The output voltage of the invertor is limited in accordance with notch positions of a master controller of the electric vehicle so as to be provided with a voltage notch stopping characteristic of the conventional electric vehicle. A constant speed notch for producing a constant speed running command is additionally provided in the master controller, and in response to the constant speed running command, the speed command for constant speed running is selected to be a value equal to or a value higher by a predetermined value than an actual speed of the electric vehicle at that time. When the speed of the electric vehicle approaches the speed command for constant speed running, the slip frequency is reduced to realize the constant speed running.

25 Claims, 2 Drawing Sheets

APPARATUS FOR CONTROLLING ELECTRIC VEHICLE USING INDUCTION MOTOR

BACKGROUND OF THE INVENTION

1. Field of the Invention

The present invention relates to an improvement of an apparatus for controlling an electric vehicle using an induction motor, and particularly relates to an apparatus for controlling an electric vehicle in constant speed operation.

2. Description of the Prior Art

As to constant speed running of an electric vehicle using an induction motor, Japanese Patent Unexamined Publication No. 48-12418 discloses a control apparatus for an electromobile for running on a road.

That is, the control apparatus is arranged such that a slip frequency is determined by a function generator so that the slip frequency changes linearly in proportion to a deviation of an actual speed of an induction motor from a required speed with positive and negative limitations. Being not different from the general ones, the other control systems are arranged to control the output voltage of an invertor in response to a frequency command applied to the invertor.

Further, Japanese Patent Unexamined Publication No. 54-22607 discloses a control apparatus for a railway electric vehicle in which the output frequency of an invertor is controlled in response to various speed commands which are set correspondingly to respective notch commands, for example, such that 10 km/h, 30 km/h, 60 km/h, and 100 km/h are set respectively correspondingly to the first, the second, the third, and the fourth notches.

The magazine "Science of Electric Vehicle" Vol. 38, No. 2, 1985, pages 15 through 24, particularly page 20, discloses constant speed control which is attained by reducing the slip frequency when the speed of an electric vehicle approaches a limit speed.

In those control methods, however, there are disadvantages that the two former ones are much different in handling of operation of the railway electric vehicle from the conventional one and that the latter one is insufficient in freedom in the constant speed running.

SUMMARY OF THE INVENTION

An object of the present invention is to provide a control apparatus for controlling an electric vehicle using an induction motor, in which constant speed running can be performed at a desired speed while maintaining the handling of operation by a driver like in the conventional electric vehicle.

The apparatus for controlling an electric vehicle, according to the present invention, is featured in that the apparatus is provided with: means for limiting a voltage to be applied an induction motor in accordance with notch positions of a master controller; operation means for generating a constant speed running command; means for generating a speed command signal corresponding to the constant speed running command; comparator means for comparing a signal corresponding to an actual speed of the electric vehicle with the speed command signal; means for generating a second slip frequency command which changes positively or negatively in accordance with an output of the comparator means; and means for substituting the second slip frequency command for a first slip frequency command to be applied to a frequency control system when the constant speed running command is generated.

Such an arrangement makes it possible to perform constant speed running at a desired speed while maintaining the handling of operation which is not much different from that in the conventional electric vehicle.

DETAILED DESCRIPTION OF PREFERRED EMBODIMENT

Figure 1:
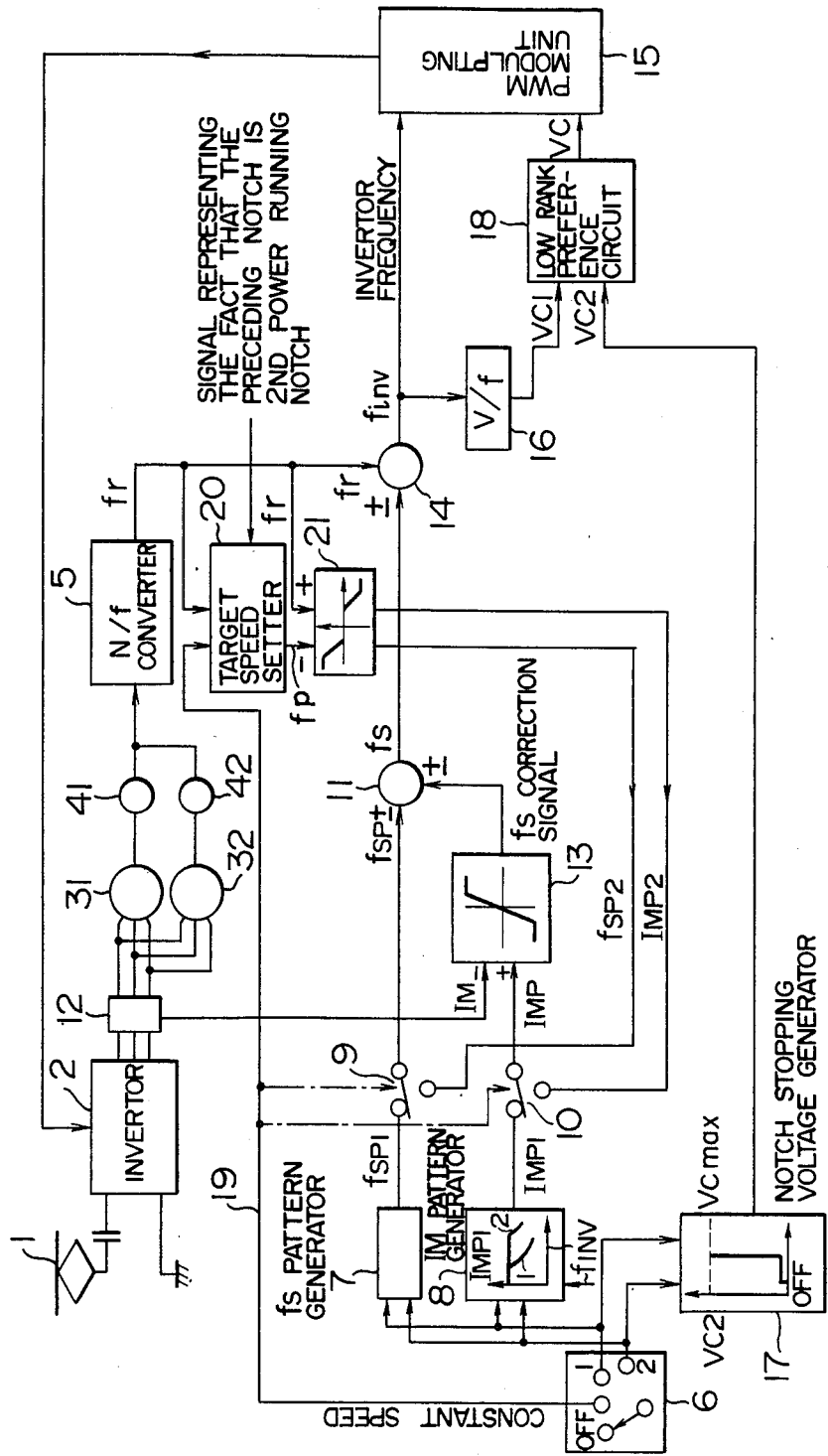
FIG. 1 is a block diagram of an embodiment of the control apparatus for controlling an electric vehicle using an induction motor according to the present invention.

Referring to the drawings, a preferred embodiment according to the present invention will be described in detail hereunder.

In FIG. 1, the DC power taken into an invertor 2 from a DC contact wire 1 is converted into an AC power of a variable voltage and a variable frequency and the AC power is supplied to induction motors 31 and 32.

In order to obtain a frequency signal $f_r$ corresponding to an actual vehicle speed, there are provided pulse generators 41 and 42 connected to the respective induction motors 31 and 32 so as to produce pulses corresponding to the actual rotational speed of the respective induction motors 31 and 32, and an N/f converter 5 for converting the number N of the pulses produced from each of the pulse generators 41 and 42 into a frequency signal $f_r$.

A master controller 6 is provided with an off notch position, a first and a second notch position for power running, and a further notch position for constant speed running.

First, at the first or second notch for power running, a predetermined slip frequency pattern $f_{SP1}$ and a motor current command $I_{MP1}$ are generated by an $f_S$ pattern generator 7 and an $I_M$ pattern generator 8 respectively. At the notch position for power running, change-over switches 9 and 10 are respectively put in such states as shown in FIG. 1. Accordingly, the slip frequency command $f_{SP1}$ is applied to an adder 11 as it is. On the other hand, an actual motor current $I_M$ is detected by a current detector 12 and compared with a motor current command $I_{MP}$ by a comparator/amplifier 13. The comparator/amplifier 13 generates an $f_S$ correction signal for correcting a slip frequency command $f_{SP}$ when the actual motor current $I_M$ is deviated from the motor current command $I_{MP}$, the correction signal $f_S$ being applied to another input of the adder 11. The output of the adder 11, which is a slip frequency signal $f_S$, is, applied to an adder 14. The adder 14 adds or subtracts the slip frequency signal $f_S$ to or from the above-mentioned signal $f_r$ corresponding to the vehicle speed (which may be a rotor speed of the motor) in power running or in regeneration. The output $f_{INV}$ of the adder 14 is applied to a PWM modulating unit 15 as a frequency command for the invertor.

The invertor frequency command $f_{INV}$ is applied also to a V/f converter 16 for generating a control voltage $V_{C1}$ so as to make the ratio (V/f) of the voltage V to the frequency f constant. At the first or second notch for power running, a maximum modulation ratio limit voltage generator 17 generates a maximum modulation ratio limit $V_{C2}$ settled for every notch as shown in the drawing. A lower rank preference circuit 18 selects one of the control voltage $V_{C1}$ and the maximum modulation ratio limit $V_{C2}$ which is lower in rank than the other and applies the selected voltage of a lower rank to the PWM modulating unit 15 as an invertor-output voltage command $V_C$. The PWM modulating unit 15 controls the operation frequency and degree of modulation of the invertor 2 on the basis of the invertor frequency command $f_{INV}$ and the invertor-output voltage command $V_C$.

Now, in the $I_M$ pattern generator 8, the output $f_{SP1}$ is maintained constant at the second power running notch, but given such a limitation as shown in the drawing in the first power running notch as the invertor frequency command $f_{INV}$ is increased. This is because if only the control voltage $V_C$ would be suppressed to the maximum modulation ratio limit $V_{C2}$ in the first power running notch while leaving the slip frequency $f_S$ as it is in a large value, the limitation for the voltage would be released so that large torque might be suddenly generated when the second power running notch is tuned on next. Accordingly, also the slip frequency $f_S$ is reduced by the $f_S$ correction signal of the current control system.

In this embodiment, there are provided only two notches, the first and the second ones, for power running, and at the second notch, a voltage corresponding to the maximum output voltage of the invertor is produced from the maximum modulation ratio limit generator 17 as illustrated by the reference characters $V_{Cmax}$ in the drawing, with no factual voltage limitation. This is because it is considered that more than two power running notches are not necessary since also a constant speed running command described later is used. In this embodiment, there is provided two notch positions for power running including the first and second notches. The second notch which provides maximum running speed is generally called "the power running last notch" or "full notch".

Of the foregoing control systems, the control system for controlling the control voltage $V_C$ on the basis of $V/s$=constant may be substituted by such a control system as follows. That is, the control voltage $V_{C1}$ to be applied to the low rank preference circuit 18 is obtained in accordance with the output of the comparator/amplifier 13 for amplifying the deviation of the current feedback value $I_M$ from the current command $I_{MP}$. This is because in the frequency control system on the basis of $f_{INV}=f_r \pm f_S$, $I_M$ becomes nearly constant if V/f is made constant, while V/f becomes nearly constant if $I_M$ is made constant, and therefore it is possible to use any one of the two control systems based on the two foregoing relations under the conditions that V/f and $I_M$ are made constant respectively.

The foregoing control in power running and in regeneration is carried out in the same manner as the well-known control of the electric vehicle using an induction motor, for example, as shown in the notching curve in page 20 of the above-mentioned "Science of Electric Vehicle".

Here, if the master controller 6 is turned onto the constant speed running notch position, a constant speed command line 19 responds to a constant speed command to change the respective contact positions of the change-over switches 9 and 10 into positions in contrast to those shown in the drawing. The constant speed command is applied also to a target speed setter so that the signal $f_r$ corresponding to the vehicle speed at that time (which may be the rotational speed of the motor) is latched and made to be a speed command signal $f_p$ thereafter. On the other hand, if there exists a signal representing the fact that the immediately preceding notch is the second one for power running when the constant speed command is applied, the setting is made such that Speed command signal $f_p =$ (Latched signal $f_r$ corresponding to vehicle speed) +

(Signal corresponding to 5 km/h)

Figure 2:
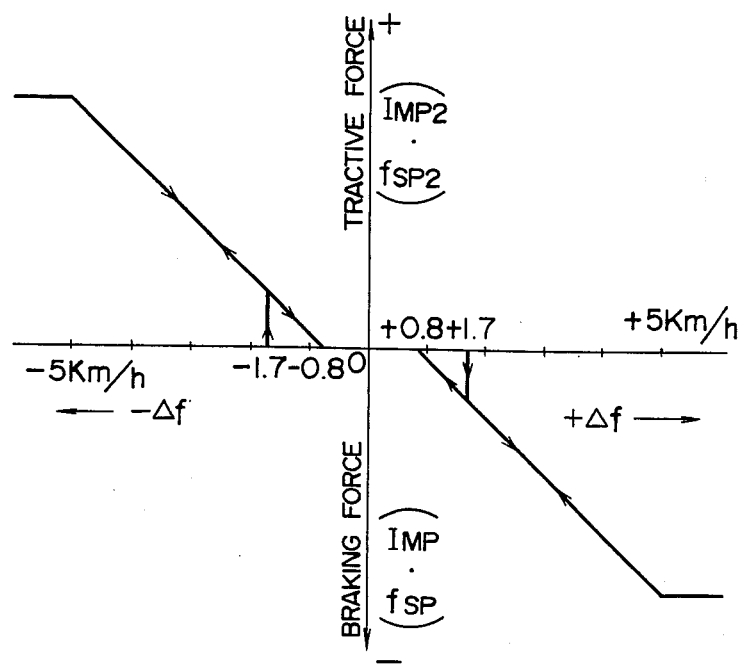
FIG. 2 is a diagram showing a command characteristic of tractive force versus speed deviations.

A comparator/amplifier 21 compares the speed command signal $f_p$ with the vehicle speed corresponding signal $f_r$ and generates a second slip frequency signal $f_{SP2}$ and a second current command signal $I_{MP2}$ with respect to the deviation f of the signal $f_r$ from the speed command signal $f_p$ as shown in FIG. 2. These second command signals $f_{SP2}$ and $I_{MP2}$ are passed through the change-over switches 9 and 10 respectively so as to be used as a new slip frequency command $f_{SP}$ and a new motor current command $I_{MP}$ respectively.

Accordingly, if the constant speed notch is turned on when the vehicle speed has been accelerated to a speed in the vicinity of a desired one, the vehicle speed is smoothly further raised by 5 km/h and then constant speed running is carried out so as to keep the raised speed while effecting power or regeneration running.

If the constant speed notch is turned on from coasting at the off-notch or from the first power running notch, the vehicle speed corresponding signal $f_r$ is used as it is as the speed command $f_p$ thereafter, and the constant speed running is effected in the same manner as above.

The change-over between the power running and regenerating running can be performed smoothly by providing a slight dead zone (corresponding to ±5 km/h) in the characteristics of the comparator/amplifier 21 as shown by way of example in FIG. 2. Further, if the characteristics of the comparator/amplifier 21 are set so as to saturate at values corresponding to ±5 km/h, it is possible to obtain a constant speed characteristic within a range of a constant speed command ±5 km/h.

Figure 3A:
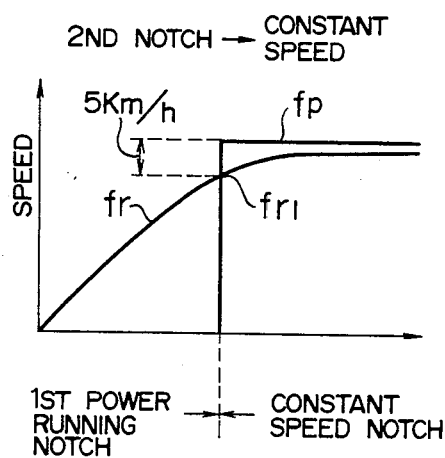
FIGS. 3A and 3B are diagrams showing speed characteristics in transition into constant speed running.
Figure 3B:
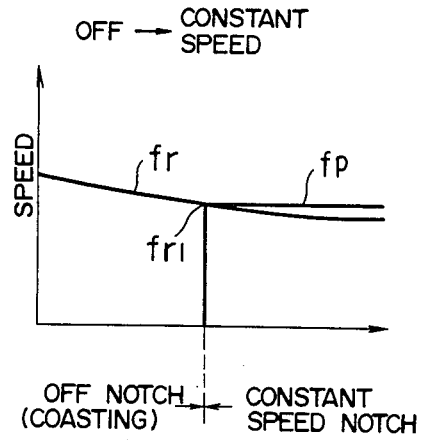

FIGS. 3A and 3B show examples of changes of the vehicle speed corresponding signal $f_r$ and the speed command $f_p$, in the case where the constant speed notch is turned on from the second power running notch and in the case where the constant speed notch is turned on from the off-notch (for coasting), respectively, in the foregoing embodiment.

As seen from FIGS. 3A and 3B, if the constant speed notch is turned on in the midway of acceleration at the second power running notch, the constant speed command $f_p$ thereafter is made to be $f_p$=(Vehicle speed corresponding signal $f_{r1}$ at that time)+(Value corresponding to 5 km/h)

so that the running can be smoothly shifted to the constant speed running without suddenly reducing the torque.

Further, if the notch is changed over from the off-notch position (for coasting) to the constant speed notch position, the constant speed command $f_p$ thereafter is made to be f=(Vehicle speed corresponding signal $f_{r1}$ at that time)

so that the running can be smoothly shifted from coasting to the constant speed running similarly to the above case.

Although provided in the master controller in this embodiment, the operation means for generating a constant speed command may be provided separately from the master controller. Although selected to be only two, the number of the power running notches may be easily selected to be more than two. Further, it is easy to provide a modification in which the running mode is shifted to the constant speed running through such a procedure that constant speed running is commanded after designation of a speed command in the constant speed running by using a key board or the like, without determining the speed command for the constant speed running in accordance with a signal corresponding to an actual vehicle speed.

According to the present invention, it is made possible to perform constant speed running at a desired speed while remaining the sense of handling notches in the conventional railway electric vehicle.

What is claimed is:

1. An apparatus for controlling an electric vehicle provided with an electric power converter for producing an output having a variable voltage and a variable frequency, an induction motor supplied with said output of said electric power converter, speed detecting means for producing an actual speed signal corresponding to an actual speed of said vehicle, frequency control means for adding/reducing a first slip frequency command to/from said actual speed signal to thereby control a frequency of said output of said power converter, voltage control means for controlling a voltage of said output of said power converter so as to make said voltage be in proportion to a frequency control command from said frequency control means, or for controlling said voltage in accordance with a deviation of an actual motor current signal from a motor current command; said apparatus further comprising:
   means for limiting a voltage command of said voltage control means correspondingly to notch positions of a master controller;
   operation means for generating a constant speed running command;
   means for generating a speed command signal corresponding to said constant speed running command;
   comparator means for comparing said actual speed signal with said speed command;
   means for generating a second slip frequency command which changes positively or negatively in accordance with an output of said comparator means; and
   means for substituting said second slip frequency command for said first slip frequency command when said constant speed running command is generated.

2. An apparatus for controlling an electric vehicle according to claim 1, in which said means for generating said speed command signal corresponding to said constant speed running command determines said speed command signal in accordance with a signal corresponding to an actual speed of said vehicle when said operation means is operated.

3. An apparatus for controlling an electric motor vehicle according to claim 2, in which said speed command signal is made to be said actual vehicle speed corresponding signal when said operation means is operated in coasting.

4. An apparatus for controlling an electric motor vehicle according to claim 2, in which said speed command signal is made higher than said actual vehicle speed corresponding signal by a predetermined value when said operation means is operated at one of said notches for power running including the last notch.

5. An apparatus for controlling an electric motor vehicle according to claim 3, in which said speed command signal is made higher than said actual vehicle speed corresponding signal by a predetermined value when said operation means is operated at one of said notches for power running including the last notch.

6. An apparatus for controlling an electric motor vehicle according to claim 2, in which said operation means is constituted by said master controller and arranged to generate said constant speed running command when said master controller is operated to put a lever thereof at a specific position.

7. An apparatus for controlling an electric motor vehicle according to claim 3, in which said operation means is constituted by said master controller and arranged to generate said constant speed running command when said master controller is operated to put a lever thereof at a specific position.

8. An apparatus for controlling an electric motor vehicle according to claim 4, in which said operation means is constituted by said master controller and arranged to generate said constant speed running command when said master controller is operated to put a lever thereof at a specific position.

9. An apparatus for controlling an electric motor vehicle according to claim 5, in which said operation means is constituted by said master controller and arranged to generate said constant speed running command when said master controller is operated to put a lever thereof at a specific position.

10. An apparatus for controlling an electric motor vehicle according to claim 1, in which said second slip frequency command generating means is provided with comparator means for comparing said actual motor current signal with said motor current command to thereby adjust said first slip frequency command in accordance with the deviation of said actual motor current signal from said motor current command.

11. An apparatus for controlling an electric vehicle comprising:
   an electric power converter producing an output having a variable voltage and a variable frequency;
   an induction motor supplied with said output of said electric power converter;
   speed detecting means for detecting an actual speed of said vehicle and outputting a speed signal corresponding to said actual speed;
   frequency control means for controlling a frequency of said output of said power converter by either adding a slip frequency signal to said speed signal or subtracting the slip frequency signal from said speed signal;
   voltage control means for controlling a voltage of said output of said power converter;
   a master controller including a first operation means having a plurality of notch positions for selecting one of said notch positions;

means for adjusting outputs of said slip frequency signal and/or voltage control means according to one of the notch positions selected by said first operation means by acting on one of said frequency control means and said voltage control means;

second operation means for commanding constant speed running of said induction motor;

means for producing a speed command signal corresponding to the command for constant speed running from said second operation means; and means associated with said frequency control means to produce an output related to said speed command signal in response to said command of constant speed running.

12. An apparatus according to claim 11, wherein said apparatus further comprises means for producing an error signal corresponding to the difference between said speed command signal and said speed signal, and said making means receives said error signal and applies said error signal to said frequency control means as a slip frequency signal.

13. An apparatus according to claim 11, wherein said speed command signal producing means determines said speed command signal according to said speed signal when said second operation means is operated.

14. An apparatus according to claim 13, wherein said speed command signal is made to be said speed signal when said second operation means is operated in coasting of said electric vehicle.

15. An apparatus according to claim 13, wherein said speed command signal is made higher than said speed signal by a predetermined value wherein said second operation means is operated at a certain notch position for power running.

16. An apparatus according to claim 13, wherein said second operation means includes said master controller and is arranged to generate said constant speed running command when said first operation means is operated to select a certain notch position.

17. An apparatus for controlling an electric vehicle comprising:

an electric power converter producing an output having a variable voltage and a variable frequency;

an induction motor supplied with said output of said electric power converter;

speed detecting means for detecting an actual speed of said vehicle and outputting a speed signal corresponding to said actual speed;

frequency control means for controlling a frequency of said output of said power converter by either adding a slip frequency signal to said speed signal or subtracting the slip frequency signal from said speed signal;

voltage control means for controlling a voltage of said output of said power converter;

a master controller including a first operation means having a plurality of notch positions for selecting one of said notch positions;

means for limiting an output of said voltage control means according to one of the notch positions selected by said first operation means;

second operation means for commanding constant speed running of said induction motor;

means for producing a speed command signal corresponding to the command for constant speed running from said second operation means; and means associated with said frequency control means to produce an output related to said speed command signal in response to said command of constant speed running.

18. An apparatus according to claim 17, wherein said apparatus further comprises means for producing an error signal corresponding to the difference between said speed command signal and said speed signal, and said making means receives said error signal and applies said error signal to said frequency control means as a slip frequency signal.

19. An apparatus according to claim 17, wherein said speed command signal producing means determines said speed command signal according to said speed signal when said second operation means is operated.

20. An apparatus according to claim 18, wherein said speed command signal is made to be said speed signal when said second operation means is operated during coasting of said electric vehicle.

21. An apparatus according to claim 18, wherein said speed command is made higher than said speed signal by a predetermined value when said second operation means is operated at a certain notch position for power running.

22. An apparatus according to claim 18, wherein said second operation means includes said master controller and is arranged to generate said constant speed running command when said first operation means is operated to select a certain notch position.

23. An apparatus for controlling an electric vehicle comprising:

an electric power converter producing an output having a variable voltage and a variable frequency;

an induction motor supplied with said output of said electric power converter;

speed detecting means for detecting an actual speed of said vehicle and outputting a speed signal corresponding to said actual speed;

frequency control means for controlling a frequency of said output of said power converter by either adding a first slip frequency signal to said speed signal or subtracting the slip frequency signal from said speed signal;

voltage control means for controlling a voltage of said output of said power converter in proportional to the output of said frequency control means;

a master controller including operation means having a plurality of notch positions of power running and constant speed runnning for selecting one of said notch positions;

means for limiting output of said voltage control means according to one of the notch positions of the power running selected by said operation means;

means, in response to the selecting of a notch position of constant speed running at said master controller, for producing a speed command signal corresponding to the speed signal at a time when said notch is selected;

means for comparing said speed command signal and said speed signal;

means for generating a second slip frequency signal which is varied according to the output of said comparing means; and means for replacing said first slip frequency signal with said second slip frequency signal when said notch position of constant speed running is selected.

24. An apparatus according to claim 23, wherein said speed command signal is made to be said speed signal when said operation means is operated during coasting of said electric vehicle.

25. An apparatus according to claim 23, wherein said speed command is made higher than said speed signal by a predetermined value when said operation means is operated from a certain power running notch position to said constant speed running notch position.

* * * * *